United States Patent
Pawar et al.

(10) Patent No.: US 10,880,224 B1
(45) Date of Patent: Dec. 29, 2020

(54) METHOD AND APPARATUS FOR SELECTING A VOICE CODING RATE BASED ON THE AIR INTERFACE EFFICIENCY OF THE SERVING BASE STATION

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Krishna Sitaram, Chantilly, VA (US); Chunmei Liu, Great Falls, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 979 days.

(21) Appl. No.: 14/993,253

(22) Filed: Jan. 12, 2016

(51) Int. Cl.
| | |
|---|---|
| *H04L 12/811* | (2013.01) |
| *H04B 7/0452* | (2017.01) |
| *H04B 7/06* | (2006.01) |
| *H04W 24/02* | (2009.01) |

(52) U.S. Cl.
CPC .......... *H04L 47/38* (2013.01); *H04B 7/0452* (2013.01); *H04B 7/061* (2013.01); *H04B 7/0617* (2013.01); *H04W 24/02* (2013.01)

(58) Field of Classification Search
CPC ..... H04L 47/38; H04B 7/0617; H04B 7/0452; H04B 7/061; H04W 24/02
See application file for complete search history.

(56) References Cited

U.S. PATENT DOCUMENTS

| | | | | |
|---|---|---|---|---|
| 5,987,319 | A | * 11/1999 | Hermansson | ......... H04L 1/0009 370/329 |
| 8,254,328 | B2 | 8/2012 | Yoshida et al. | |
| 8,260,198 | B2 | * 9/2012 | Yamaura | .............. H04B 7/0417 375/267 |
| 9,826,442 | B2 | * 11/2017 | Dinan | ............... H04W 36/0055 |

OTHER PUBLICATIONS

J. Sjoberg et al., "RTP Payload Format and File Storage Format for the Adaptive Multi-Rate (AMR) and Adaptive Multi-Rate Wideband (AMR-WB) Audio Codecs", Request for Comments 4867, Network Working Group, 2007.

(Continued)

*Primary Examiner* — Asad M Nawaz
*Assistant Examiner* — Thomas R Cairns (57) ABSTRACT

A voice coding rate is selected for a voice call involving a user equipment (UE) device based on an air interface efficiency of the base station serving the UE device. The air interface efficiency of the base station is determined based on at least one of (i) a beamforming capability of the base station, (ii) a multi-user multiple-input multiple-output (MU-MIMO) capability of the base station, or (iii) an antenna configuration of the base station. The voice coding rate could be selected by either the UE device or by the base station. The UE device transmits to the base station during the voice call one or more voice frames that convey voice data coded at the selected voice coding rate. During the voice call, a new air interface efficiency may be determined, and a new voice coding rate may be selected based on the new air interface efficiency.

9 Claims, 7 Drawing Sheets

(56) References Cited

OTHER PUBLICATIONS

Duplicy et al., "MU-MIMO in LTE Systems", EURASIP Journal on Wireless Communications and Networking, Hindawi Publishing Corporation, Article ID 496763, 2011.

Ju et al., "Downlink MIMO in LTE-Advanced: SU-MIMO vs. MU-MIMO", IEEE Communications Magazine, pp. 140-147, Feb. 2012.

European Telecommunications Standards Institute, "Digital cellular telecommunications system (Phase 2+); Universal Mobile Telecommunications (UMTS); LTE; Speech codec speech processing functions; Adaptive Multi-Rate—Wideband (AMR-WB) speech codec; Transcoding functions," Technical Specification, 3GPP TS 26.190 version 12.0.0 Release 12, 2014.

\* cited by examiner

METHOD AND APPARATUS FOR SELECTING A VOICE CODING RATE BASED ON THE AIR INTERFACE EFFICIENCY OF THE SERVING BASE STATION

BACKGROUND

A typical cellular wireless network includes a number of base stations each radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover between coverage areas, and other functions related to air interface communication.

Such radio access technologies may support voice communications. Typically, the voice communications occur in a digital format in which voice is digitally sampled at a particular sample rate. The digital samples may then be encoded into frames of voice data. The encoding can involve data compression as well as the introduction of redundant data for error correction. The resulting frames of voice data have a particular bit rate, which may be referred to as the "voice coding rate." A voice codec or vocoder may digitally process voice into frames of voice data using a particular set of parameters, such as sample rate and type of encoding, to provide a particular bit rate and resulting voice quality. In general, higher voice coding rates provide better voice quality. However, higher voice coding rates also consume more air interface resources.

Adaptive multi-rate (AMR) vocoders are a class of vocoders that have been used for voice communications in cellular wireless networks. Within the class of AMR vocoders, different voice coding modes have been defined. AMR Narrowband (AMR-NB) vocoders use a sample rate of 8 kHz and voice coding rates ranging from 1.8 kilobits per second (kbps) to 12.2 kbps. AMR Wideband (AMR-WB) vocoders use a sample rate of 16 kHz and voice coding rates ranging from 1.75 kbps to 23.85 kbps.

Vocoders with higher sample rates have also been proposed. Super Wideband (SWB) vocoders use a sample rate of 32 kHz and voice coding rates ranging from 9.6 kbps to 128 kbps. Fullband (FB) vocoders use a sample rate of 48 kHz and voice coding rates ranging from 16.4 kbps to 128 kbps.

Overview

In general, higher voice coding rates provide better voice quality. But higher voice coding rates also consume more air interface resources. To balance these considerations, the present disclosure provides embodiments in which a voice coding rate for a voice call involving a user equipment (UE) device is selected based on an air interface efficiency of the base station serving the UE device. The air interface efficiency of the base station may be determined with regard to one of more the following factors: (i) a beamforming capability of the base station; (ii) a multi-user multi-input multi-output capability (MU-MIMO) capability of the base station; or (iii) an antenna configuration of the base station. The voice coding rate may also be changed during the call if the air interface efficiency changes (e.g., because of a change in conditions at the base station or a handover to a new base station).

In one aspect, example embodiments provide a method for a UE device. The UE device determines an air interface efficiency of the base station serving the UE device. Determining the air interface efficiency involves determining at least one of: (i) a beamforming capability of the base station; (ii) a MU-MIMO capability of the base station; or (iii) an antenna configuration of the base station. The UE device selects a voice coding rate for a voice call involving the UE device based on the air interface efficiency of the base station. The UE device transmits an indication of the selected voice coding rate to the base station. The UE device transmits one or more voice frames to the base station during the voice call. The one or more voice frames convey voice data coded at the selected voice coding rate.

In another aspect, example embodiments provide a method for a base station serving a UE device. The base station device determines an air interface efficiency of the base station. Determining the air interface efficiency involves determining at least one of: (i) a beamforming capability of the base station; (ii) a MU-MIMO capability of the base station; or (iii) an antenna configuration of the base station. The base station selects a voice coding rate for a voice call involving the UE device based on the air interface efficiency of the base station. The base station transmits an indication of the selected voice coding rate to the UE device. The base station transmits one or more voice frames to the UE device during the voice call. The one or more voice frames convey voice data coded at the selected voice coding rate.

In yet another aspect, example embodiments provide a UE device comprising a wireless communication interface, a processor, data storage, and program instructions stored in the data storage. The program instructions are executable by the processor to cause the UE device to perform functions comprising: (a) receiving, via the wireless communication interface, air interface efficiency data for a base station serving the UE device; (b) determining an air interface efficiency of the base station based on the air interface efficiency data, wherein determining the air interface efficiency of the base station comprises determining at least one of a beamforming capability of the base station, a MU-MIMO capability of the base station, or an antenna configuration of the base station; and (c) selecting, based on the air interface efficiency of the base station, a voice coding rate for a voice call involving the UE device.

DETAILED DESCRIPTION

1. Introduction

In general, voice quality will be regarded as better when a higher voice coding rate is used for a voice call, but a higher voice coding rate consumes more air interface resources. For example, an AMR-WB 23.85 vocoder, which uses a voice coding rate of 23.85 kbps, will generally be perceived as providing better quality voice than an AMR-WB 12.65 vocoder, which uses a voice coding rate of 12.65 kbps. However, transmitting voice data with a voice coding rate of 23.85 kbps consumes more air interface resources than transmitting voice data with a voice coding rate of only 12.65 kbps.

One approach for resolving these competing considerations is to use a fixed voice coding rate that generally provides an acceptable balance between voice quality and usage of air interface resources. For example, a cellular wireless network may use a voice coding rate of 12.65 kbps (e.g., AMR-WB 12.65) for all voice communications. A fixed voice coding rate, however, may result in missed opportunities to provide better voice quality in situations where capacity is available. Specifically, if capacity is available, the user experience may be improved by using a voice coding rate of 23.85 kbps (e.g., AMR-WB 23.85). On the other hand, using a voice coding rate of 23.85 kbps may not be feasible in capacity constrained situations.

The inventors have recognized that an alternative approach is to make the voice coding rate that is used for voice communications selectable. The selection could be made by either a UE or the base station serving the UE, for example, when a voice call involving the UE is initiated. In example embodiments, the selection is made based on one or more factors that are indicative of the air interface efficiency of the base station. Such factors may include, without limitation: (i) a beamforming capability of the base station; (ii) a multi-user multiple-input multiple-output (MU-MIMO) capability of the base station; and/or (iii) an antenna configuration of the base station.

The base station may determine its beamforming capability by determining the number of UEs that the base station is currently beamforming to and determining the number of UEs that the base station could potentially beamform to. The sum of these two numbers may provide a beamforming capability index that maps to a particular voice coding rate. Specifically, higher beamforming capability indexes may map to higher voice coding rates.

The base station may determine its MU-MIMO capability by determining the number of UEs that are currently being paired for MU-MIMO by the base and determining the number of UEs that could potentially be paired for MU-MIMO by the base station. The sum of these two numbers may provide a MU-MIMO capability index that maps to a particular voice coding rate. Specifically, higher MU-MIMO capability indexes may map to higher voice coding rates.

The base station may determine its antenna configuration by determining the number of transmit antennas and the number of receive antennas of the base station. The sum of these two numbers may provide an antenna configuration index that maps to a particular voice coding rate. Specifically, higher antenna configuration indexes may map to higher voice coding rates.

Once the base station has determined its air interface efficiency, the base station may provide an indication of its air interface efficiency to the UE, for example, in the form of a beamforming capability index, MU-MIMO capability index, and/or antenna configuration index—or in the form of the underlying information used to determine these indexes. The UE may then use this information to select a voice coding rate. For example, the UE may apply a beamforming capability mapping to map a beamforming capability index to a voice coding rate, a MU-MIMO capability mapping to map a MU-MIMO capability index to a voice coding rate, or an antenna configuration mapping to map an antenna configuration index to a voice coding rate. Once the UE has selected the voice coding rate, the UE may begin transmitting voice frames that convey voice data coded at the selected voice coding rate.

Alternatively, the base station may select the voice coding rate, for example, based on the determined beamforming capability index, MU-MIMO capability index, and/or antenna configuration index, such as by applying a mapping as described above. The base station may then transmit an indication of the selected voice coding rate to the UE.

In this way, a voice coding rate may be selected for a voice call from among a plurality of different voice coding rates. The selection may be made at the beginning of the voice call, and the selected voice coding rate may be used throughout the call. However, the voice coding rate could also change during the call, for example, because the base station's beamforming or MU-MIMO capability changes or because of a handover of the UE to a different base station.

By selecting the voice coding rate based on the base station's air interface efficiency, the voice quality can beneficially be improved when efficiency is high and can be reduced to provide a beneficial capacity savings when efficiency is low.

2. Example Network Architecture

For purposes of illustration, example embodiments will be described herein for a voice call using an LTE air interface protocol and network architecture. Thus, a voice-over-LTE (VoLTE) call is described herein as an example embodiment. It is to be understood, however, that other types of air interface protocols, network architectures, or voice calls could be used.

Figure 1:
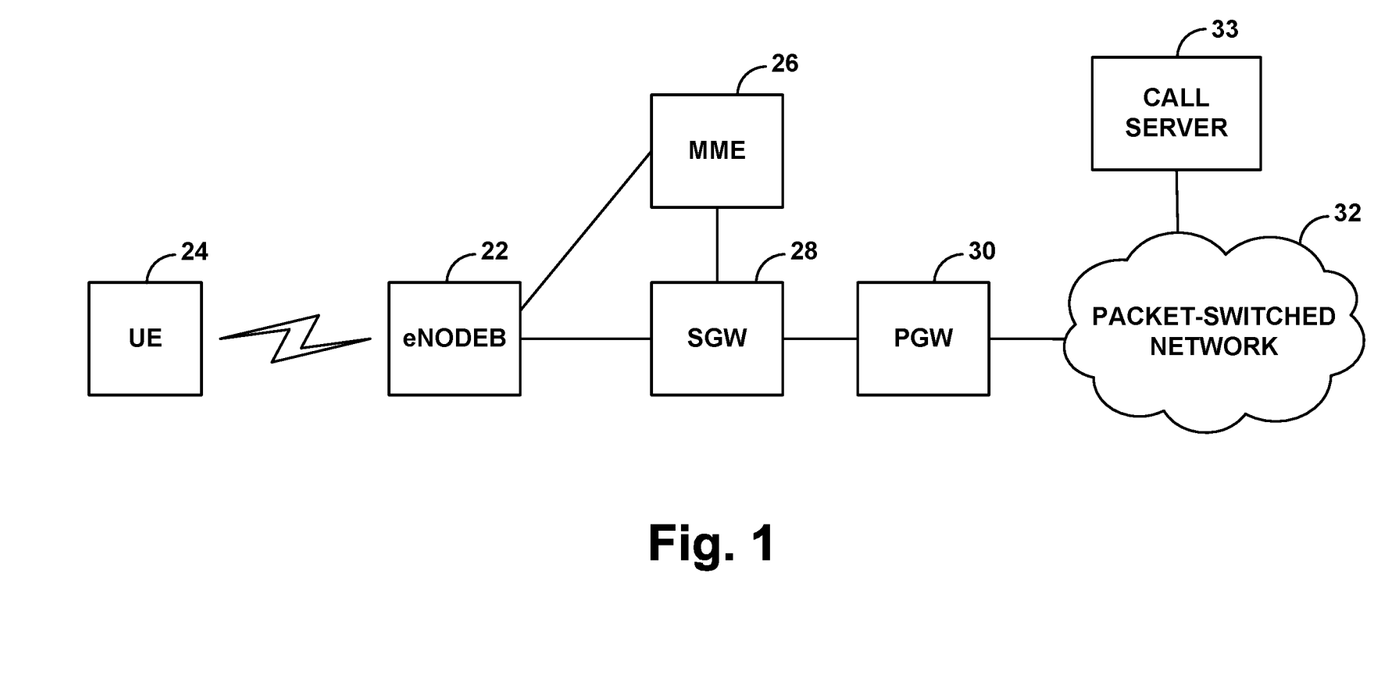
FIG. 1 is a simplified block diagram of an example wireless communication system in which embodiments of the present disclosure can be implemented.

FIG. 1 illustrates a representative LTE network, which functions primarily to serve UEs with wireless packet data communication service, including VoLTE service, but may also provide other functions. As shown, the LTE network includes a representative LTE base station 22 known as an evolved Node B (eNodeB). The eNodeB has an antenna structure (e.g., patch, dipole, phased array, and/or other antenna arrangement) and associated equipment for providing LTE coverage in which to serve UEs such as an example UE 24.

In this example, eNodeB 22 has a communication interface with a mobility management entity (MME) 26, which may function as a signaling controller for the LTE network. Further, eNodeB 22 has a communication interface with a serving gateway (SGW) 28, which in turn has a communication interface with a packet-data network gateway (PGW) 30 that provides connectivity with a packet-switched network 32, and the MME 26 has a communication interface with the SGW 28. Also shown is a call server 33, which may function to set up, manage, and tear down, VoLTE calls through the packet-switched network 32. In practice, each of these entities may sit on a core packet network operated by a wireless service provider, and the communication interfaces between these entities may be logical packet-switched interfaces. Other arrangements are possible as well.

Figure 2:
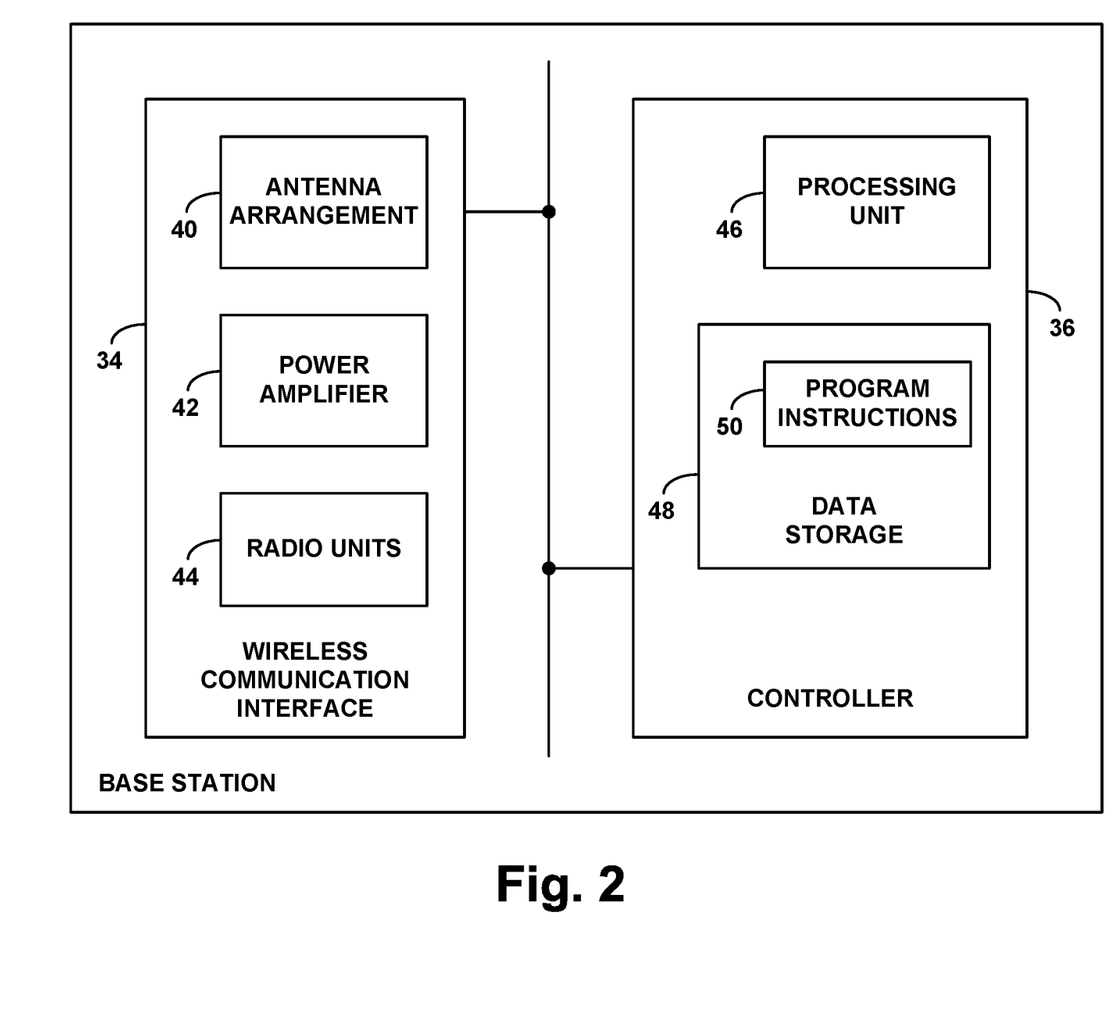
FIG. 2 is a simplified block diagram of an example base station operable to implement embodiments of the present disclosure.

FIG. 2 is next a simplified block diagram of a representative base station such as eNodeB 22, depicting some of the components that can be included in such an entity. Generally, this base station could take various forms, such as a macro base station having a tall antenna tower and power amplifier to provide a wide range of coverage, or a small base station (such as a picocell, femtocell, small cell, mini macro base station, relay base station, mobile hotspot, or the like), having a smaller form factor and lower power and thus providing a relatively smaller range of coverage. As shown in FIG. 2, the representative base station may include, among other elements, a wireless communication interface 34 and a controller 36, which may be integrated together or communicatively linked together by a system bus, network, or other connection mechanism 38.

As shown, wireless communication interface 34 may include an antenna arrangement 40, which may be tower mounted or provided in another form, and associated components such as a power amplifier 42 and one or more radio units 44 for engaging in air interface communication with UEs via the antenna arrangement 40, so as to transmit bearer data and control signaling to the UEs and to receive bearer data and control signaling from the UEs.

Controller 36 may then include a processing unit 46 (e.g., one or more general purpose and/or special purpose processors) and non-transitory data storage 48 (e.g., one or more volatile and/or non-volatile storage components such as magnetic, optical, flash or other storage, possibly integrated in whole or in part with the processing unit). And data storage 48 may hold (e.g., have encoded thereon) program instructions 50, which may be executable by processing unit 46 to carry out or cause to be carried out various base station operations described herein. Although the controller 36 is shown within the base station, some or all of the control functionality could alternatively be provided external to the base station, such as by another entity in the network.

3. Example Methods

Figure 3:
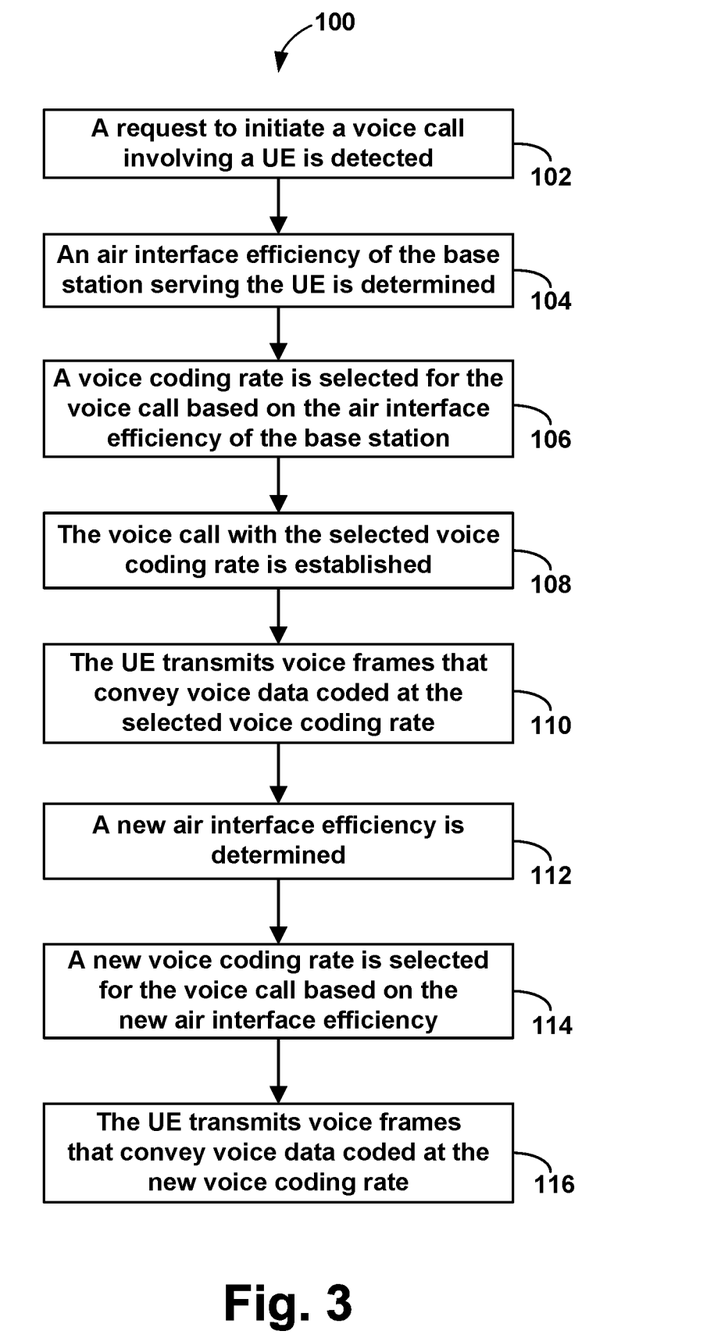
FIG. 3 is a flow chart illustrating an example method of selecting voice coding rates, in accordance with the present disclosure.
Figure 4:
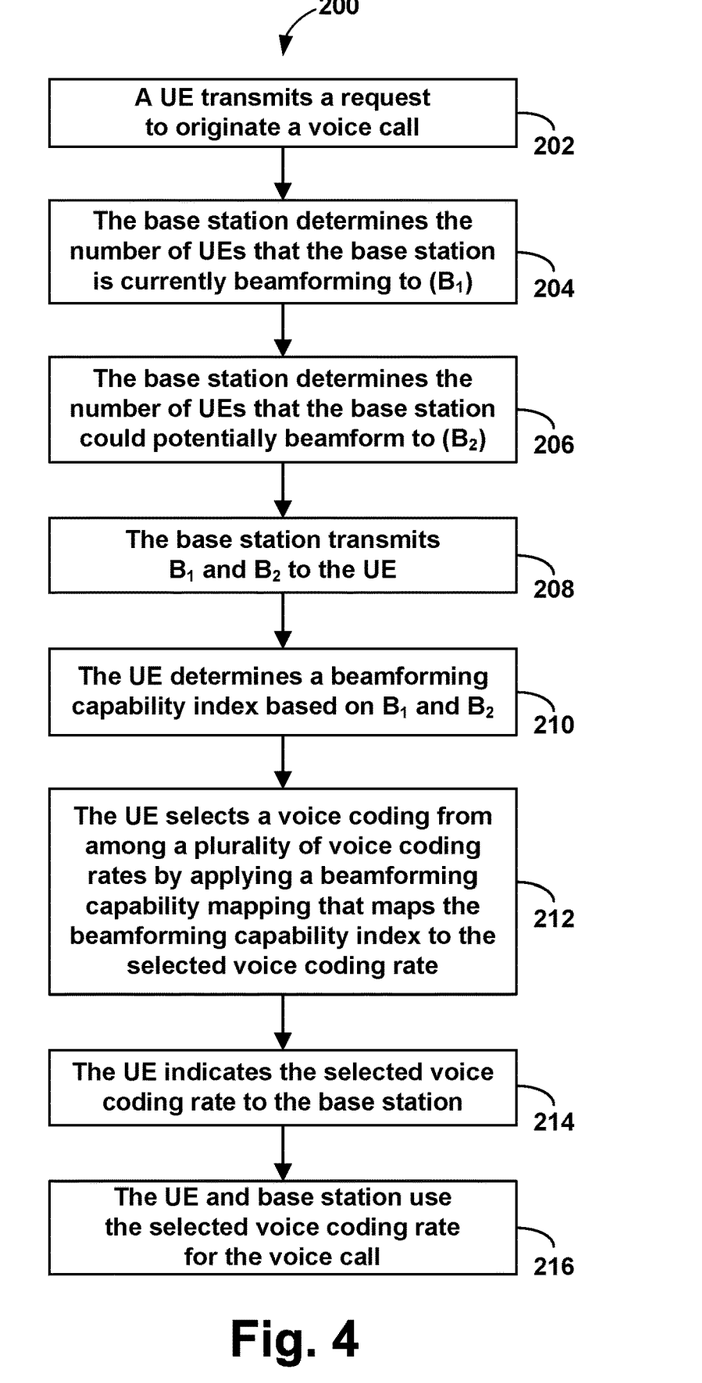
FIG. 4 is a flow chart illustrating an example method in which a voice coding rate is selected based on a beamforming capability of the serving base station, in accordance with the present disclosure.
Figure 5:
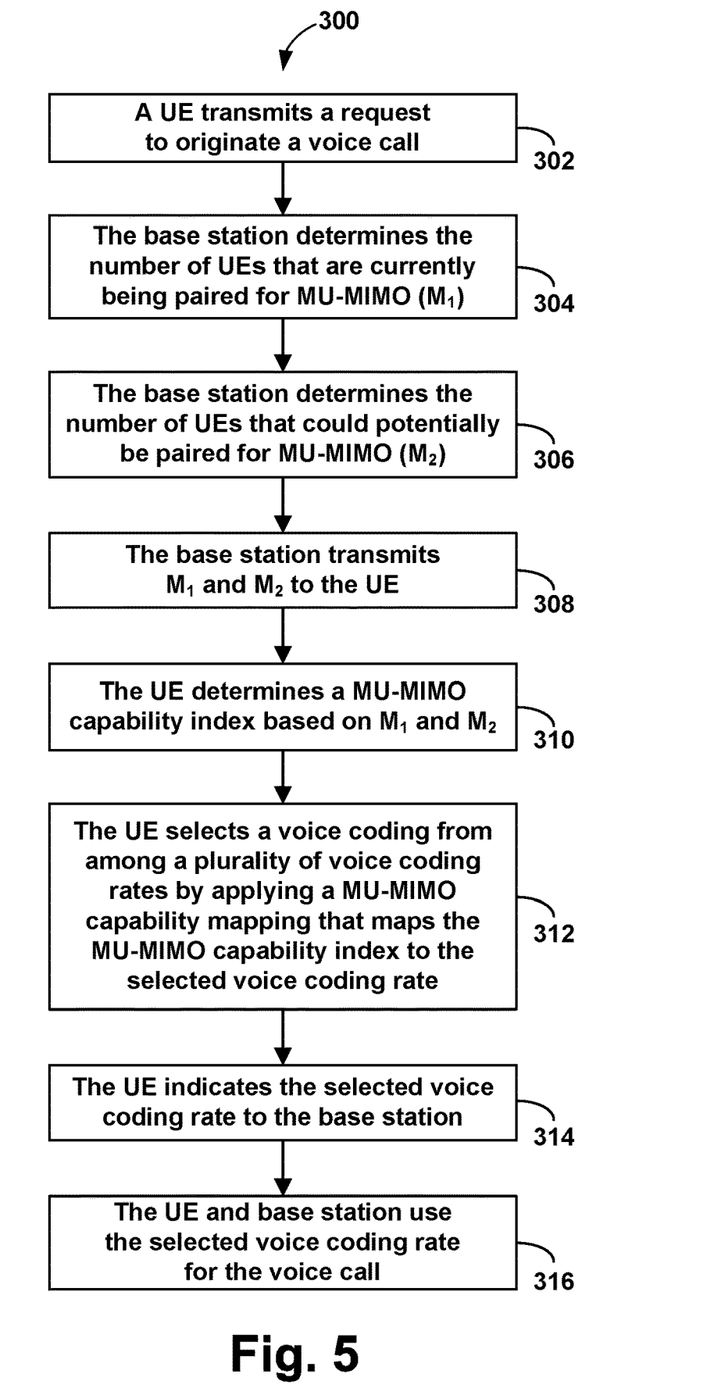
FIG. 5 is a flow chart illustrating an example method in which a voice coding rate is selected based on a multi-use multiple-input multiple-output (MU-MIMO) capability of the serving base station, in accordance with the present disclosure.
Figure 6:
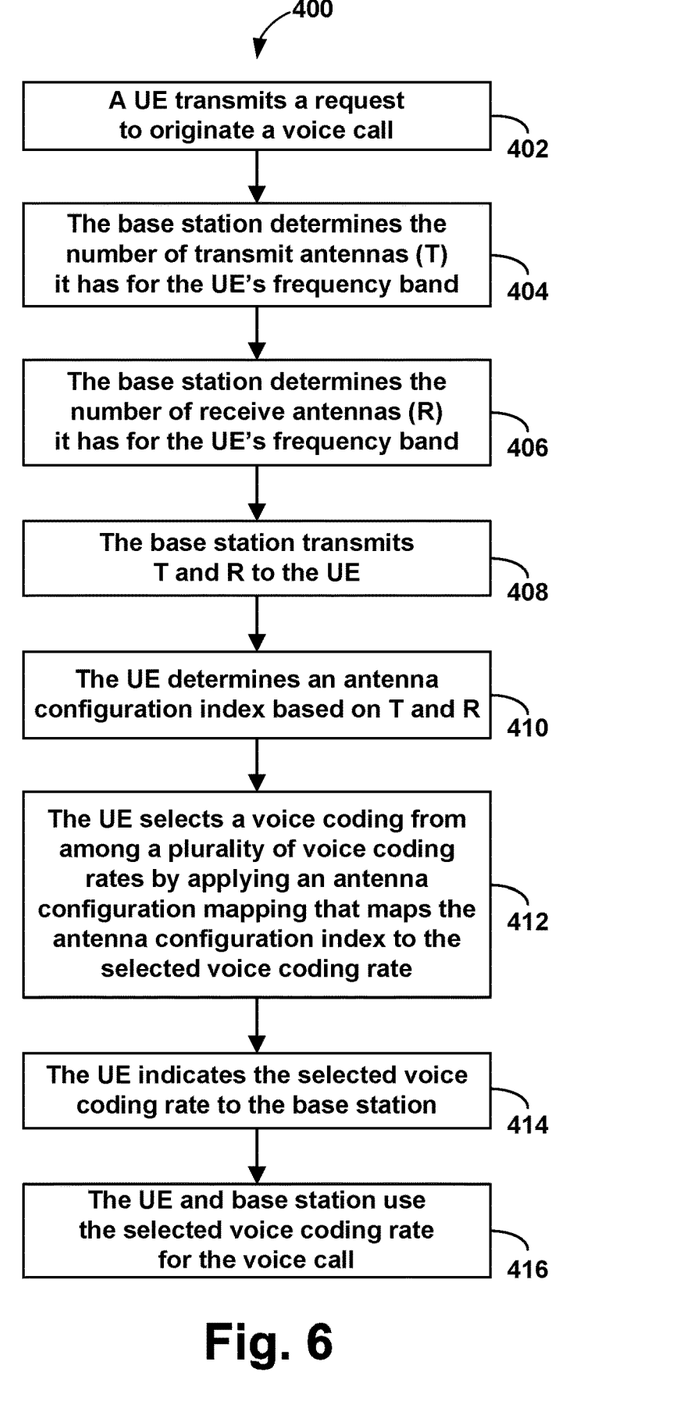
FIG. 6 is a flow chart illustrating an example method in which a voice coding rate is selected based on an antenna configuration of the serving base station, in accordance with the present disclosure.

FIGS. 3, 4, 5, and 6 are flow charts illustrating example methods in which a voice coding rate for a voice call involving a UE is selected based on the serving base station's air interface efficiency. FIG. 3 illustrates an overall method. FIGS. 4-6 illustrate example scenarios that could be used within the overall method illustrated in FIG. 3. FIG. 4 illustrates an example in which the voice coding rate is selected based on the base station's beamforming capability. FIG. 5 illustrates an example in which the voice coding rate is selected based on the base station's MU-MIMO capability. FIG. 6 illustrates an example in which the voice coding rate is selected based on the base station's antenna configuration. In the examples illustrated in FIGS. 4-6, the voice coding rate is selected based on one particular factor indicative of the base station's air interface efficiency, namely, beamforming capability, MU-MIMO capability, or antenna configuration. It is to be understood, however, that the voice coding rate could be based on a combination of factors indicative of the base station's air interface efficiency (e.g., the base station's beamforming capability in combination with the base station's MU-MIMO capability). In addition to one or more factors indicative of the base station's air interface efficiency, other information could be taken into account when selecting the voice coding rate, such as RF conditions or base station load.

FIG. 3 illustrates a method 100 involving a UE (e.g., UE 24) that is being served by a base station (e.g., eNodeB 22). For purposes of illustration, FIG. 3 is described with reference with to a LTE network architecture as shown in FIG. 1 and for the case that the voice call is a VoLTE call. It is to be understood, however, that method 100 could be applied to other types of networks, air interface protocols, and/or voice calls.

Method 100 begins when a request to initiate a voice call involving a UE is detected, as indicated by block 102. The request could originate from the UE. For example, the UE could transmit a call origination request that is detected by an element of the LTE network (e.g., eNodeB 22 or MME 26). Alternatively, the request could originate from a calling party that desires to establish a voice call to the UE. For example, the request could be received via packet-switched network 32 and detected by eNodeB 22, MME 26, or other element of the LTE network.

In response to the request, the air interface efficiency of the base station serving the UE is determined, as indicated by block 104. In example embodiments, determining the air interface efficiency of the base station could involve determining at least one of: (i) a beamforming capability of the base station; (ii) a MU-MIMO capability of the base station; or (iii) an antenna configuration of the base station. The determination could be made by either the base station or by the UE based on information provided by the base station. For example, the UE may determine a beamforming capability index, MU-MIMO capability index, or antenna configuration index based on information provided by the base station.

A voice coding rate is then selected for the voice call based on the air interface efficiency of the base station, as indicated by block 106. The selected could be made by the UE. For example, after determining a beamforming capability index, MU-MIMO capability index, or antenna configuration index for the base station, the UE may apply a mapping that maps the determined index to one of a plurality of voice coding rates. The voice coding rate that the mapping maps to is then selected by the UE, and the UE may transmit an indication of the selected voice coding rate to the base station.

Alternatively, the selection could be made by the base station. For example, the base station could determine its air interface efficiency, select a voice coding rate based on the air interface efficiency (for example, by mapping a beamforming capability index, MU-MIMO capability index, or antenna configuration index to a voice coding rate), and then transmit an indication of the selected voice coding rate to the UE.

The voice call with the selected voice coding rate is then established, as indicated by block 108. The process of establishing the voice call may involve signaling between the UE and a call server (e.g., call server 33) and/or the other endpoint of the call. The signaling may use, for example, the Session Initiation Protocol (SIP) and Session Description Protocol (SDP). The selected voice coding rate may be indicated as part of that signaling.

During the call, the UE transmits to the base station voice frames that convey voice data coded at the selected voice coding rate, as indicated by block 110. During the call, the UE may also receive from the base station voice frames in which the voice data is coded at the selected voice coding rate.

At some point during the call, a new air interface efficiency may be determined, as indicated by block 112. In some instances, a new air interface efficiency may be determined in response to a change in the conditions on which the base station's air interface efficiency is based. As one example, the base station's beamforming capability could be determined based on (i) the number of UEs that the base station is currently beamforming to and (ii) the number of UEs that the base station could potentially beamform to. Changes in these numbers could result in a new beamforming capability of the base station being determined. As another example, the base station's MU-MIMO capability could be determined based on (i) the number of UEs that are currently being paired for MU-MIMO by the base station and (ii) the number of UEs that could potentially be paired for MU-MIMO by the base station. Changes in these numbers could result in a new MU-MIMO capability of the base station being determined.

In other instances, a new air interface efficiency may be determined in response to the UE undergoing a handover to a new base station during the call. Thus, the new air interface efficiency may relate to a new base station serving the UE for the call.

In either case, the UE could determine the new air interface efficiency based on information provided by the original base station (for the case that the original base station's air interface efficiency changes during the call) or based on information provided by a new base station (for the case of a handover to a new base station during the call). Alternatively, the new air interface efficiency could be determined by the original base station or new base station and then indicated to the UE.

A new voice coding rate is then selected for the voice call based on the new air interface efficiency, as indicated by block 114. The new voice coding rate could be selected by the UE, for example, by applying a mapping. The UE may then indicate the new voice coding rate to the original or new base station. Alternatively, the new voice coding rate could be selected by the original or new base station, and the base station could transmit an indication of the new voice coding rate to the UE.

Once the new voice coding rate for the call has been selected, the UE begins transmitting voice frames that convey voice data coded at the new voice coding rate, as indicated by block 116. The UE could also receive voice frames that include voice data coded at the new voice coding rate.

In this way, the voice coding rate that is used for a voice call can adapt to the base station's air interface efficiency, which may be determined when the call is requested and during the call as conditions change. It is to be understood, however, that the base station's air interface efficiency could also be determined at other times. As one example, when a default bearer is established for a UE, the serving base station could determine its air interface efficiency and transmit information indicative of its air interface efficiency to the UE. As another example, a base station may periodically determine its air interface efficiency and broadcast this information in overhead messages. Other examples are possible as well.

a. Beamforming

Beamforming is a technique in which downlink signals transmitted by a base station are highly directional so that they can be directed to a particular UE in the base station's wireless coverage area and not received (or received at a sufficiently low level) by other UE's in the wireless coverage area. Beamforming can also provide for highly directional reception by the base station of uplink signals from the UE that is receiving the beamformed downlink signal.

This beamforming capability can increase the base station's air interface efficiency because it can provide better coverage in specific areas at the edge of the base station's coverage area. In addition, the constructive interference used to form the highly directional beam provides a signal gain (also called beamforming gain) relative to transmitting omni-directionally.

Beamforming can be achieved by using a phased array of antenna elements in the base station. The relative phases of the signals transmitted and/or received by the antenna elements are adjusted to provide for constructive interference in the desired direction and destructive interference in other directions. Further, by using different sets of phased antenna elements, a base station may be able to beamform in multiple different directions at the same time. As a result, a base station may be able to beamform to multiple UEs (up to some maximum number). In addition, while the base station is beamforming to one or more UEs, the base station may also be able to communicate with other UEs without beamforming. Thus, at any given time, a base station may be communicating with one or more UEs using beamforming, with one or more UEs that the base station could potentially beamform to (i.e., UEs that are candidates for beamforming based on predefined beamforming criteria), and with one or more UEs that are not candidates for beamforming (e.g., UEs that are located close together).

To establish beamforming to a particular UE, the base station may instruct the UE to transmit a sounding reference signal (SRS). In response, the UE transmits the SRS to the base station. The base station processes the received SRS to estimate a direction of arrival (e.g., using multiple antennas) and a distance between the base station and UE (e.g., based on timing of the received SRS). In this way, the base station can determine an approximate location of the UE and can begin beamforming to that location. The beamforming can also be adaptive, so that the beam moves as the UE moves.

FIG. 4 illustrates a method 200 in which the voice coding rate is selected based on a beamforming capability of the serving base station. In this example, method 200 begins when a UE transmits a request to originate a voice call, as indicted by block 202. The request is received by the base station serving the UE. In response, the base station determines information indicative of its beamforming capability.

Specifically, the base station determines the number of UEs that the base station is currently beamforming to ($B_1$), as indicated by block 204. The base station also determines the number of UEs that the base station could potentially beamform to ($B_2$), as indicated by block 206. The base station could determine $B_1$ by consulting its own information storage (e.g., data storage 48) or by consulting another element of the LTE network to count how many UEs have a beamforming connection to the base station. The base station could determine $B_2$ by consulting its own information storage or by consulting another element of the LTE network to identify how many UEs being served by the base station meet predefined criteria for beamforming but have not yet established a beamforming connection to the base station. In determining $B_2$, the base station could also take into account a maximum number of beamforming connections that the base station can support ($B_{max}$). In particular, the base station may determine $B_2$ such that the sum of $B_1$ and $B_2$ does not exceed $B_{max}$.

The base station then transmits $B_1$ and $B_2$ to the UE, as indicated by block 208. The base station may also attempt to establish beamforming connections to $B_2$ additional UEs. If these additional beamforming connections are successfully established, then $B_1$ could increase by $B_2$ and $B_2$ could go to zero (i.e., the UEs that were counted as potentially beamformed could instead be counted as UEs that are currently being beamformed to). As a result, the sum of $B_1$ and $B_2$ would remain unchanged. However, if the base station is not able to establish a beamforming connection with a UE that was regarded as potentially beamformed, then that UE may no longer be counted as potentially beamformed. As a result, the sum of $B_1$ and $B_2$ would be less than before, and the base station could send updated values of $B_1$ and $B_2$ to the UE.

The UE then determines a beamforming capability index based on the values of $B_1$ and $B_2$ provided by the base station, as indicated by block 210. In an example embodiment, the UE calculates the beamforming capability index as the sum of $B_1$ and $B_2$. However, other ways of determining the beamforming capability index based on $B_1$ and $B_2$ are possible as well.

The UE then selects a voice coding rate from among a plurality of voice coding rates by applying a beamforming capability mapping that maps the beamforming capability index to the selected voice coding rate, as indicated by block 212. In an example embodiment, the plurality of voice coding rates correspond to voice coding rates of a certain number of AMR-WB codecs (e.g., three AMR-WB codecs). Table 1 below illustrates an example mapping between beamforming capability indexes and voice coding rates of AMR-WB codecs.

TABLE 1

| Beamforming Capability Index | Voice Coding Rate (kbps) |
|---|---|
| 0 to 4 | 8.85 |
| 5 to 8 | 12.65 |
| >8 | 23.85 |

In the example mapping illustrated in Table 1, a beamforming capability index that is between 0 and 4 maps to a voice coding rate of 8.85 kbps, a beamforming capability index that is between 5 and 8 maps to a voice coding rate of 12.65 kbps, and a beamforming capability of index that is greater than 8 maps to a voice coding rate of 23.85 kbps. For example, if $B_1=3$ and $B_2=5$, then the UE may calculate the beamforming capability index as 8 and apply the mapping shown in Table 1 to select a voice coding rate of 12.65 kbps.

It is to be understood that Table 1 illustrates only one possible mapping. Other mappings are possible as well. For example, a beamforming capability mapping could map to a greater or fewer number of voice coding rates, could map to different voice coding rates, or could distinguish between different ranges of beamforming capability indexes.

Once the UE has selected the voice coding rate, the UE may indicate the selected voice coding rate to the base station, as indicated by block 214. Thereafter, the UE and base station may use the selected voice coding rate for the voice call, as indicated by block 216. During the call, the UE may transmit one or more voice frames that convey voice data coded at the selected voice coding rate to the base station, and the base station may transmit one or more voice frames that convey voice data coded at the selected voice coding rate to the UE.

b. MU-MIMO

MU-MIMO is a technique that allows the same air interface resources to be used by multiple UEs in the base station's coverage area. In LTE, air interface resources are in the form of resource blocks, with each resource block corresponding to a particular range of frequencies and a particular period of time. To avoid interference, a downlink resource block may be dedicated to downlink communications to one particular UE and an uplink resource block may dedicated to uplink communications from one particular UE. However, using MU-MIMO, a downlink resource block and/or uplink resource block can be shared by multiple UEs (e.g., a pair of UEs). The sharing by a pair of UEs is enabled by the UEs having a certain amount of spatial diversity in their respective propagation channels. In addition, various coding techniques may be used. On the downlink, user-specific reference symbols (URS) can be used. On the uplink, orthogonal cover codes (OCC) can be used to differentiate transmissions of different UEs. By sharing resource blocks among a pair of UEs, MU-MIMO can increase air interface efficiency.

A base station may apply certain selection criteria to identify UEs that can be paired using MU-MIMO. Such selection criteria may include the UEs having a certain threshold level of channel orthogonality (i.e., spatial diversity) and having a signal-and-interference-to-noise ratio (SINR) above a certain threshold level. Other criteria may be applied as well. Thus, the air interface efficiency gains that MU-MIMO can provide may not be realized unless and until a pair of UEs satisfies the selection criteria. For UEs that do not satisfy the selection criteria, the base station may provide for wireless communication without using MU-MIMO. Thus, at any given time, a base station may be communicating with one or more pairs of UEs using MU-MIMO, with UEs that are candidates for MU-MIMO, and with one or more UEs that are not candidates for MU-MIMO.

FIG. 5 illustrates a method 300 in which the voice coding rate is selected based on a MU-MIMO capability of the serving base station. In this example, method 300 begins when a UE transmits a request to originate a voice call, as indicted by block 302. The request is received by the base station serving the UE. In response, the base station determines information indicative of its MU-MIMO capability.

Specifically, the base station determines the number of UEs that are currently being paired for MU-MIMO by the base station ($M_1$), as indicated by block 304. The base station also determines the number of UEs that could potentially be paired for MU-MIMO by the base station ($M_2$), as indicated by block 306. The base station could determine $M_1$ by consulting its own information storage (e.g., data storage 48) or by consulting another element of the LTE network to count how many UEs being served by the base station are involved in MU-MIMO. The base station could determine $M_2$ by consulting its own information storage or by consulting another element of the LTE network to identify how many UEs being served by the base station meet predefined criteria for MU-MIMO but have not yet been paired for MU-MIMO by the base station. In determining $M_2$, the base station could also take into account a maximum number of MU-MIMO connections that the base station can support ($M_{max}$). In particular, the base station may determine $M_2$ such that the sum of $M_1$ and $M_2$ does not exceed $M_{max}$.

The base station then transmits $M_1$ and $M_2$ to the UE, as indicated by block 308. The base station may also attempt to establish MU-MIMO connections to $M_2$ additional UEs. If these additional MU-MIMO connections are successfully established, then $M_1$ could increase by $M_2$ and $M_2$ could go to zero (i.e., the UEs that were counted as potentially paired for MU-MIMO could instead be counted as UEs that are currently being paired for MU-MIMO). As a result, the sum of $M_1$ and $M_2$ would remain unchanged. However, if the base station is not able to establish a MU-MIMO connection with a UE that was regarded as a MU-MIMO candidate, then that UE may no longer be counted as a UE that could be paired for MU-MIMO. As a result, the sum of $M_1$ and $M_2$ would be less than before, and the base station could send updated values of $M_1$ and $M_2$ to the UE.

The UE then determines a MU-MIMO capability index based on the values of $M_1$ and $M_2$ provided by the base station, as indicated by block 310. In an example embodiment, the UE calculates the MU-MIMO capability index as the sum of $M_1$ and $M_2$. However, other ways of determining the MU-MIMO capability index based on $M_1$ and $M_2$ are possible as well.

The UE then selects a voice coding rate from among a plurality of voice coding rates by applying a MU-MIMO capability mapping that maps the MU-MIMO capability index to the selected voice coding rate, as indicated by block 312. In an example embodiment, the plurality of voice coding rates correspond to voice coding rates of a certain number of AMR-WB codecs (e.g., three AMR-WB codecs). Table 2 below illustrates an example mapping between MU-MIMO capability indexes and voice coding rates of AMR-WB codecs.

TABLE 2

| MU-MIMO Capability Index | Voice Coding Rate (kbps) |
| --- | --- |
| 0 to 4 | 8.85 |
| 5 to 8 | 12.65 |
| >8 | 23.85 |

In the example mapping illustrated in Table 2, a beamforming capability index that is between 0 and 4 maps to a voice coding rate of 8.85 kbps, a beamforming capability index that is between 5 and 8 maps to a voice coding rate of 12.65 kbps, and a beamforming capability of index that is greater than 8 maps to a voice coding rate of 23.85 kbps. For example, if $M_1=3$ and $M_2=5$, then the UE may calculate the MU-MIMO capability index as 8 and apply the mapping shown in Table 2 to select a voice coding rate of 12.65 kbps.

It is to be understood that Table 2 illustrates only one possible mapping. Other mappings are possible as well. For example, a MU-MIMO capability mapping could map to a greater or fewer number of voice coding rates, could map to different voice coding rates, or could distinguish between different ranges of MU-MIMO capability indexes.

Once the UE has selected the voice coding rate, the UE may indicate the selected voice coding rate to the base station, as indicated by block 314. Thereafter, the UE and base station may use the selected voice coding rate for the voice call, as indicated by block 316. During the call, the UE may transmit one or more voice frames that convey voice data coded at the selected voice coding rate to the base station, and the base station may transmit one or more voice frames that convey voice data coded at the selected voice coding rate to the UE.

c. Antenna Configuration

A base station's antenna configuration can also affect the base station's air interface efficiency. In general, the base station's air interface efficiency will increase as the number of transmit and receive antennas used by the base station increases. There can be exceptions to this general rule, however. For certain frequencies (e.g., 800 MHz), a configuration with 2 transmit antennas may be more efficient than a configuration with 4 transmit antennas.

FIG. 6 illustrates a method 400 in which the voice coding rate is selected based on an antenna configuration of the serving base station. In this example, method 400 begins when a UE transmits a request to originate a voice call, as indicted by block 402. The UE is being served by the base station in a particular frequency band. The UE's frequency band could be, for example, an 800 MHz, 1900 MHz, or 2500 MHz frequency band. The UE's frequency band could be one of a plurality of frequency bands supported by the base station. Alternatively, the UE's frequency band could be the only frequency band supported by the base station.

The request is received by the base station serving the UE. In response, the base station determines information indicative of its antenna configuration. Specifically, the base station determines the number of transmit antennas (T) that it has for the UE's frequency band, as indicated by block 404. The base station also determines the number of receive antennas (R) that it has for the UE's frequency band, as indicated by block 406. The base station could determine T and R by consulting its own information storage (e.g., data storage 48) or by consulting another element of the LTE network.

The base station then transmits T and R to the UE, as indicated by block 408. The UE then determines an antenna configuration index based on the values of T and R provided by the base station, as indicated by block 410. In an example embodiment, the UE calculates the antenna configuration index as the sum of T and R. However, other ways of determining the antenna configuration index based on T and R are possible as well.

The UE then selects a voice coding rate from among a plurality of voice coding rates by applying an antenna configuration mapping that maps the antenna configuration index to the selected voice coding rate, as indicated by block 412. The antenna configuration mapping could be specific for the UE's frequency band. In an example embodiment, the plurality of voice coding rates correspond to voice coding rates of a certain number of AMR-WB codecs (e.g., five AMR-WB codecs). Table 3 below illustrates an example mapping between antenna configuration indexes and voice coding rates of AMR-WB codecs.

TABLE 3

| Antenna Configuration Index | Voice Coding Rate (kbps) |
| --- | --- |
| 4 (T = 2, R = 2) | 8.85 |
| 6 (T = 2, R = 4) | 12.65 |
| 8 (T = 4, R = 4) | 14.25 |
| 12 (T = 4, R = 8) | 18.25 |
| 16 (T = 8, R = 8) | 23.85 |

In the example mapping illustrated in Table 3, an antenna configuration index of 4 (T=2, R=2) maps to a voice coding rate of 8.85 kbps, an antenna configuration index of 6 (T=2, R=4) maps to a voice coding rate of 12.65 kbps, an antenna configuration index of 8 (T=4, R=4) maps to a voice coding rate of 14.25 kbps, an antenna configuration index of 12 (T=4, R=8) maps to a voice coding rate of 18.25 kbps, and an antenna configuration index of 16 (T=8, R=8) maps to a voice coding rate of 23.85 kbps.

It is to be understood that Table 3 illustrates only one possible mapping. Other mappings are possible as well. For example, an antenna configuration mapping could map to a greater or fewer number of voice coding rates, could map to different voice coding rates, or could distinguish between antenna configuration indexes.

Once the UE has selected the voice coding rate, the UE may indicate the selected voice coding rate to the base station, as indicated by block 414. Thereafter, the UE and base station may use the selected voice coding rate for the voice call, as indicated by block 416. During the call, the UE may transmit one or more voice frames that convey voice data coded at the selected voice coding rate to the base station, and the base station may transmit one or more voice frames that convey voice data coded at the selected voice coding rate to the UE.

4. Example UE

Figure 7:
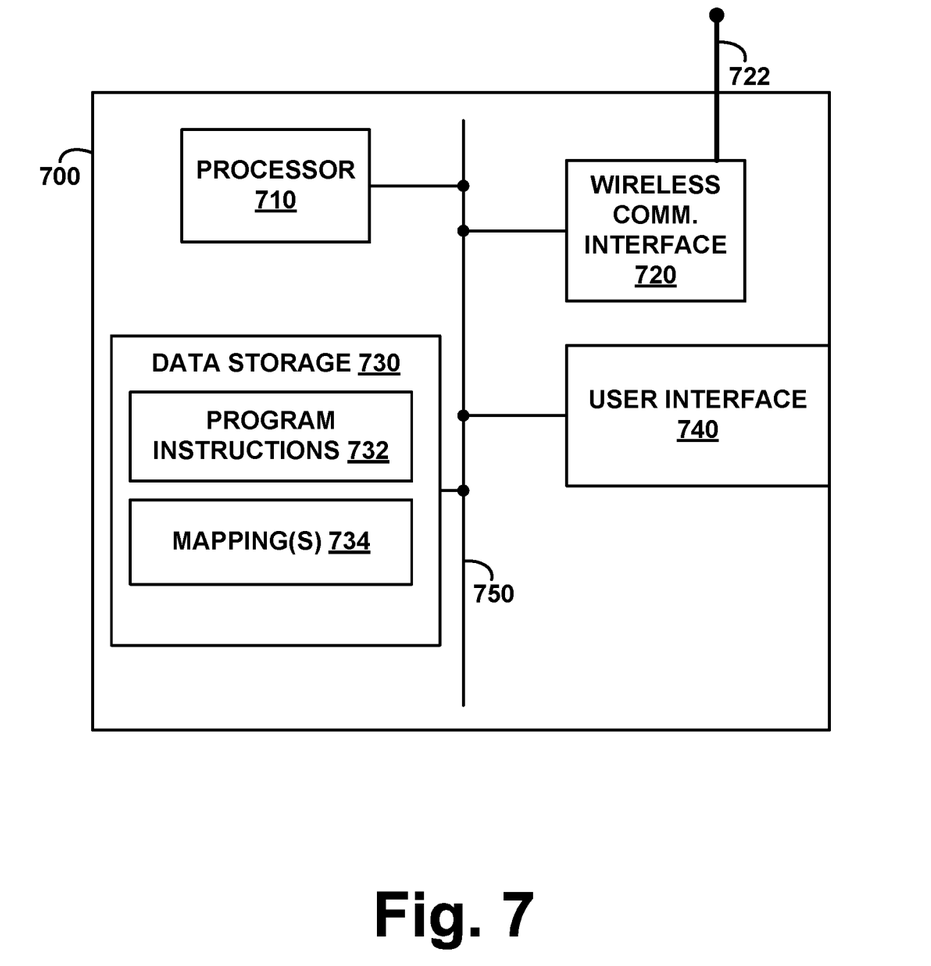
FIG. 7 is simplified block diagram of an example UE, in accordance with the present disclosure.

FIG. 7 is a simplified block diagram of a UE 700 that could operate in accordance with the methods described in this disclosure. UE 700 could be, for example, a cellular telephone, a wirelessly equipped computing device, or other wireless communication device. As illustrated, UE 700 may include a processor 710, a wireless communication interface 720, antenna 722, data storage 730, and a user interface 740, all coupled by a system bus 750.

Processor 710 could be, for example, a general purpose microprocessor and/or a discrete signal processor. Though processor 710 is described here as a single processor, those having skill in the art will recognize that UE 700 may contain multiple processors.

Wireless communication interface 720 may include a chipset suitable for communicating with one or more devices over antenna 722. Suitable devices may include, for example, elements of a wireless network. These elements could include macro base stations, micro base stations, pico base stations, femto base stations, low-cost internet base stations (LCIBs), or other suitable devices capable of wireless communication. The chipset could be suitable for communication using LTE protocols. Alternatively or additionally, the chipset or wireless-communication interface 720 may be able to communicate with other types of networks and devices, such as EV-DO networks, GSM networks, UMTS networks, HSPA networks, WiMAX networks, CDMA networks, Wi-Fi networks, Bluetooth devices, and/or one or more additional types of networks and devices.

Data storage 730 could be any form of non-transitory computer readable medium, such as volatile memory, non-volatile memory, one or more magnetically encoded disks, and/or one or more optically encoded disks. Data storage may store program instructions 732 that are executable by processor 710 to carry out one or more of functions described herein. In addition, data storage 730 may store parameters and application data in connection with carrying out the functions described herein. For example, data storage 730 may store one or more mapping(s) 734, such as a beamforming capability mapping, a MU-MIMO capability mapping, and/or an antenna configuration mapping as described above.

User interface 740 could include one or more input devices (e.g., a touchscreen, a keypad, buttons, camera, microphone, etc.) that can receive input from a user of UE 700. The input from the user could control the operation of UE 700 and/or provide voice, textual, or other data that UE 700 could store or transmit via the wireless communication interface 720. User interface 740 could also include one or more output devices (e.g., a display, a speaker, etc.) that can convey voice, textual, graphical, or video output to the user of UE 700.

UE 700 is able to use wireless communication interface 720 to originate and receive voice calls, such as VoLTE calls. To support such voice communication, processor 710 may execute program instructions 732 to select a voice coding rate, to code voice received via user interface 740 at the selected voice coding rate (thereby providing a vocoder function), and to use the wireless communication interface 720 to transmit the resulting voice data. Processor 710 may also execute program instructions 732 to receive via the wireless communication interface 720 voice data coded at the same or different voice coding rate, decode the voice data, and convey the resulting voice through the user interface 740.

In example embodiment, the processor 710 may execute the program instructions 732 to perform the following functions related to select a voice coding rate for a voice call: (a) receiving, via the wireless communication interface 720, air interface efficiency data for a base station serving the UE 700; (b) determining an air interface efficiency of the base station based on the air interface efficiency data; and (c) selecting, based on the air interface efficiency of the base station, a voice coding rate for a voice call involving the UE 700. The functions may further involve: transmitting to the base station, via the wireless communication interface 720, one or more voice frames that convey voice data at the selected voice coding rate; and receiving from the base station, via the wireless communication interface 720, one or more voice frames that convey voice data at the selected voice coding rate.

The air interface efficiency data for the serving base station may include data relating to the base station's beamforming capability (e.g., the number of UEs that the base station is beamforming to, the number of UEs that the base station could potentially beamform to, or a beamforming capability index based on these numbers), data relating the base station's MU-MIMO capability (e.g., the number of UEs currently being paired for MU-MIMO by the base station, the number of UEs that could potentially be paired for MU-MIMO by the base station, or a MU-MIMO capability index bases on these numbers), or data relating to the base station's antenna configuration (e.g., the number of transmit antennas that the base station has, the number of receive antennas that the base station has, or an antenna configuration index based on these numbers).

Determining the air interface efficiency of the base station could involve determining at least one of a beamforming capability of the base station, a MU-MIMO capability of the base station, or an antenna configuration of the base station. For example, based on the air interface efficiency data, a beamforming capability index, MU-MIMO capability index, or antenna configuration index could be calculated for the base station.

Selecting the voice coding rate could involve accessing a mapping, such as one of mapping(s) 734, and using the mapping to map a beamforming capability index, MU-MIMO capability index, or antenna configuration index to a voice coding rate.

The functions may further involve receiving new air interface efficiency data for the call. The new air interface data may, for example, reflect a change in conditions for the base station or a handover to a new base station. The functions may then involve determining a new air interface efficiency based on the new air interface efficiency data, selecting a new voice coding rate based on the new air interface efficiency, and transmitting voice data coded at the new voice coding rate. In this way, UE 700 can dynamically adjust the voice coding rate for a voice call based on the air interface efficiency of the base station or base stations serving the UE during the call.

Exemplary embodiments have been described above. Those skilled in the art will understand, however, that changes and modifications may be made to these embodiments without departing from the true scope and spirit of the invention.

What is claimed is:

1. A method for a user equipment (UE) device, comprising:
   selecting, by the UE device, a voice coding rate for a voice call involving the UE device based on the air interface efficiency of the base station;
   transmitting, by the UE device, an indication of the selected voice coding rate to the base station; and
   transmitting, by the UE device, one or more voice frames to the base station during the voice call, wherein the one or more voice frames convey voice data coded at the selected voice coding rate.

2. The method of claim 1, wherein determining the beamforming capability of the base station comprises:
   receiving, by the UE device, (i) an indication of a number of UE devices that the base station is currently beamforming to, and (ii) an indication of a number of UE devices that the base station could potentially beamform to; and
   determining, by the UE device, a beamforming capability index of the base station based on the number of UE devices that the base station is currently beamforming to and the number of UE devices that the base station could potentially beamform to.

3. The method of claim 2, wherein the UE device has access to a mapping between a plurality of beamforming capability indexes and a plurality of voice coding rates, wherein the mapping maps each beamforming capability index to a respective voice coding rate, and wherein selecting, by the UE device, a voice coding rate based on the air interface efficiency of the base station comprises:
   applying the mapping to map the beamforming capability index of the base station to one of the plurality of voice coding rates.

4. The method of claim 1, further comprising:
   determining, by the UE device, a new air interface efficiency during the voice call;
selecting, by the UE device, a new voice coding rate for the voice call based on the new air interface efficiency; and
   transmitting, by the UE device, one or more subsequent voice frames to the base station during the voice call, wherein the one subsequent voice frames convey voice data coded at the new voice coding rate.

5. A method for a base station serving a user equipment (UE) device, the method comprising:
   determining, by the base station, an air interface efficiency of the base station, wherein determining the air interface efficiency of the base station comprises determining;
   selecting, by the base station, a voice coding rate for a voice call involving the UE device based on the air interface efficiency of the base station;
   transmitting, by the base station, an indication of the selected voice coding rate to the UE device; and
   transmitting, by the base station, one or more voice frames to the UE device during the voice call, wherein the one or more voice frames convey voice data coded at the selected voice coding rate.

6. The method of claim 5, wherein determining the air interface efficiency of the base station comprises determining a beamforming capability index of the base station based on (i) a number of UE devices that the base station is currently beamforming to and (ii) a number of UE devices that the base station could potentially beamform to.

7. The method of claim 6, wherein the base station has access to a mapping between a plurality of beamforming capability indexes and a plurality of voice coding rates, wherein the mapping maps each beamforming capability index to a respective voice coding rate, and wherein selecting, by the base station, a voice coding rate based on the air interface efficiency of the base station comprises:
   applying the mapping to map the beamforming capability index of the base station to one of the plurality of voice coding rates.

8. A user equipment (UE) device, comprising
   a wireless communication interface;
   a processor;
   data storage;
   program instructions stored in the data storage and executable by the processor to cause the UE device to perform functions, the functions comprising:
      receiving, via the wireless communication interface, air interface efficiency data for a base station serving the UE device;
      determining an air interface efficiency of the base station based on the air interface efficiency data, wherein determining the air interface efficiency of the base station comprises determining at least one of a beamforming capability of the base station; and
      selecting, based on the air interface efficiency of the base station, a voice coding rate for a voice call involving the UE device.

9. The UE device of claim 8, wherein the air interface efficiency data comprises data relating to the base station's beamforming capability.

* * * * *

UNITED STATES PATENT AND TRADEMARK OFFICE
CERTIFICATE OF CORRECTION

PATENT NO. : 10,880,224 B1
APPLICATION NO. : 14/993253
DATED : December 29, 2020
INVENTOR(S) : Hemanth B. Pawar et al.

It is certified that error appears in the above-identified patent and that said Letters Patent is hereby corrected as shown below:

In the Claims

Claim 1, Column 15, Line 18, before selecting, by the UE device, a voice coding rate for a, please add "determining, by the (UE) device, an air interface efficiency of a base station serving the UE device, wherein determining the air interface efficiency of the base station comprises determining a beamforming capability of the base station;"

Claim 5, Column 16, Line 7, after determining, before selecting, please add "a beamforming capability of the base station"

Claim 8, Column 16, Line 46, after the base station comprises determining, please delete "at least one of"

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*